United States Patent
Talley et al.

(10) Patent No.: US 9,277,528 B1
(45) Date of Patent: *Mar. 1, 2016

(54) CONFIGURATION OF TRACKING AREA LAYERS

(71) Applicant: Sprint Spectrum L.P., Overland Park, KS (US)

(72) Inventors: Ryan S. Talley, Overland Park, KS (US); Kyle C. Allen, Overland Park, KS (US); Nicolas A. Nehme Antoun, Olathe, KS (US); Khalid M. Medhat, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 162 days.

This patent is subject to a terminal disclaimer.

(21) Appl. No.: 13/964,454

(22) Filed: Aug. 12, 2013

(51) Int. Cl.
*H04W 72/00* (2009.01)
*H04W 68/00* (2009.01)

(52) U.S. Cl.
CPC ................................... *H04W 68/00* (2013.01)

(58) Field of Classification Search
CPC ... H04W 4/02; H04W 28/0226; H04W 36/00; H04W 28/031; H04W 72/1226; H04W 16/08; H04W 16/10; H04W 16/12; H04W 28/08; H04W 52/343; H04W 8/16; H04W 16/32; H04W 16/24; H04W 36/04; H04W 36/0055; H04W 36/0061; H04W 36/0066; H04W 36/20; H04W 36/22; H04W 36/34; H04W 84/02; H04W 84/045; H04W 28/00; H04W 28/0273; H04W 28/0284; H04W 28/0289; H04W 52/244
USPC ................... 455/461, 404.2, 418–420, 422.1, 455/423–425, 432.1–432.3, 433–434, 455/435.1–435.2, 436–450, 453, 455/456.1–456.3, 456.5–456.6, 524–525, 455/550.1, 552.1, 556.2, 560–561; 370/229–230, 230.1, 252, 237, 310, 370/328, 331, 338
See application file for complete search history.

(56) References Cited

U.S. PATENT DOCUMENTS

| | | |
|---|---|---|
| 5,289,527 A | 2/1994 | Tiedemann |
| 5,754,959 A | 5/1998 | Ueno |
| 5,875,400 A | 2/1999 | Madhavapeddy |
| 5,889,494 A | 3/1999 | Reudink |
| 5,969,689 A | 10/1999 | Martek |
| 6,006,098 A | 12/1999 | Rathnasabapathy |
| 6,058,308 A * | 5/2000 | Kallin et al. ............... 455/432.3 |
| 6,246,674 B1 | 6/2001 | Feuerstein |
| 6,282,429 B1 | 8/2001 | Baiyor |
| 6,347,234 B1 | 2/2002 | Scherzer |
| 6,434,380 B1 | 8/2002 | Andersson |
| 6,937,863 B1 * | 8/2005 | Gordon et al. ................ 455/446 |
| 8,185,124 B2 * | 5/2012 | Antic .................... H04W 16/06 455/452.1 |
| 8,472,956 B2 * | 6/2013 | Wang et al. .................... 455/436 |
| 2003/0145092 A1 * | 7/2003 | Funato .................. H04W 48/20 709/229 |
| 2004/0198396 A1 | 10/2004 | Fransioli |
| 2007/0142057 A1 * | 6/2007 | Murakami et al. ......... 455/452.2 |
| 2007/0213061 A1 * | 9/2007 | Kim ............................. 455/436 |
| 2008/0102826 A1 * | 5/2008 | Voyer et al. ............... 455/432.1 |
| 2010/0085884 A1 * | 4/2010 | Srinivasan et al. ............ 370/252 |
| 2011/0110270 A1 * | 5/2011 | Leng et al. .................... 370/254 |
| 2011/0176424 A1 * | 7/2011 | Yang et al. ................. 370/236.2 |
| 2011/0199901 A1 * | 8/2011 | Kavanaugh et al. ....... 370/230.1 |
| 2012/0155341 A1 * | 6/2012 | Yamamoto et al. ........... 370/281 |
| 2013/0157710 A1 * | 6/2013 | Nammi et al. ................ 455/525 |

OTHER PUBLICATIONS

Guang Wan et al, Department of Computer Science and Engineering Southern Methodist University, "A Dynamic Paging Scheme for Wireless Communication Systems."

* cited by examiner

*Primary Examiner* — Meless Zewdu

(57) ABSTRACT

A method and corresponding system is provided help establish a zone-based paging configuration. In accordance with the method, a RAN entity may evaluate the level of traffic in several small cells of the RAN, identify those small cells that have at least a threshold level of traffic, and responsively construct a new tracking area that includes the identified small cells. In another aspect of the method, a UE that is registered in a current tracking area, may move into coverage of a new sector and receive from a base station associated with the new sector two or more tracking area IDs. The UE may then determine that at least one of the tracking area IDs is indicative of the tracking area in which the UE is currently registered, and responsively operate in the new sector without transmitting a tracking area update message.

17 Claims, 6 Drawing Sheets

CONFIGURATION OF TRACKING AREA LAYERS

BACKGROUND

In typical cellular wireless communication systems, wireless communication devices (e.g., cell phones, personal digital assistants, laptops, netbooks, tablets, and/or other wirelessly equipped devices, any of which may be referred to as a user equipment device (UE) for brevity) subscribe to service from a given cellular wireless service provider. In practice, a service provider will operate one or more networks (sometimes referred to as radio access networks (RANs)) including base stations that radiate to define one or more wireless coverage areas, referred to as sectors, where the subscriber UEs can operate.

Through each base station (and corresponding RAN), a UE can obtain connectivity to other networks such as the public switched telephone network (PTSN) and the Internet. Further, each RAN may include one or more radio network controllers (RNCs), or the like, which may be integrated with or otherwise in communication with the base stations, and which may include or be in communication with a switch or gateway that provides connectivity with one or more transport networks. Conveniently with this arrangement, a UE that is positioned within coverage of the RAN may communicate with a base station and in turn, via the base station, with other served devices or with other entities on the transport network.

Generally, wireless communications between a given UE and a serving base station in a RAN are carried out in accordance with one or more air interface protocols that define a mechanism for wireless exchange of information between the UE and the base station. Typically, an air interface protocol will define a "downlink" encompassing communications from the base station to the UE and a "uplink" encompassing communications from the UE to the base station. Further, each of these links may be structured to define particular channels on which certain types of data may be transmitted. These channels may be defined through the use of various mechanisms, including for example, time division multiplexing, code division multiplexing (e.g., spread-spectrum modulation), frequency division multiplexing, as well as others.

The downlink, for example, may define (i) a pilot channel on which the RAN may broadcast a pilot signal to allow UEs to detect wireless coverage, (ii) system parameter channels (e.g., an overhead channel) on which the RAN may broadcast system operational parameters for reference by UEs so that the UE can then seek network access, (iii) paging channels on which the RAN may broadcast page messages to alert UEs of incoming communications, and (iv) traffic channels on which the RAN may transmit bearer traffic (e.g., application data) for receipt by UEs. And the uplink, for example, may define (i) control channels on which UEs may transmit registration messages and call origination requests, and (ii) traffic channels on which UEs may transmit bearer traffic for receipt by the RAN.

In operation, when a RAN seeks to communicate with a UE (e.g., to establish an incoming voice call or transmit incoming packet data), the RAN may first page the UE on a paging channel. The purpose of paging the UE may be to determine whether the UE is still within range of a wireless coverage area, and if so, to notify the UE of the incoming communication, and perhaps assign radio resources to the UE. To carry out a page, the RAN may transmit to the base station that is currently serving the UE some indication of the reason for the page (e.g., that there is an incoming call or data packet directed to the UE). In turn, the serving base station may use this indication to generate a page record, which the base station may transmit to the UE in one way or another. The UE may then reply to the base station with a page-response message (PRM), or some other message indicating successful receipt of the page record.

Given the scarcity of paging channel resources, some wireless communication networks implement a "zone-based" paging scheme. In such a scheme, some coverage areas, or sectors, of the RAN are arranged into tracking areas, each with a respective tracking area ID. To facilitate paging on a zone basis, each base station in the RAN may broadcast in its respective sectors as one of the overhead parameters the tracking area ID for the tracking area in which the sector is located. A UE operating in the network may then programmatically monitor the tracking area IDs specified in the overhead messages and may register with the network by, for example, transmitting to the RAN a "tracking area update" message when the UE detects that it has moved into a new tracking area (or for other reasons).

A RAN entity that facilitates paging (such as a switch or mobility management entity (MME)), may collect and store (in a database, for example) these tracking area update messages as a way to keep track of the tracking areas in which the UEs are located. When a switch or other RAN component seeks to page a certain UE, the switch or other component may then refer to the database and send the page message to just those base stations that are within the tracking area of the UE's most recent registration.

OVERVIEW

As mentioned above, each base station in a RAN radiates to define one or more wireless coverage sectors in which UEs may receive wireless service from that base station. In addition to the traditional base stations of a RAN, some wireless service providers provide supplementary coverage devices (e.g., femtotcells, picocells, microcells, or another type of device) that radiate to define additional coverage areas in which subscriber UEs can access the service provider's network. Wireless service providers may provide these devices to help alleviate load in a wireless communication system, to help fill in coverage gaps, or perhaps for other reasons.

These supplementary coverage devices may be situated in residential or other identified high-traffic areas and radiate to define coverage areas that are sized somewhat smaller than the other coverage areas of the system. By way of example, a supplementary coverage device may radiate to define a coverage area that is on the order of about 50-500 feet in diameter (depending on the type of device), whereas a traditional base station may radiate to define a coverage area that is on the order of about one or more miles in diameter (depending on the environment). For brevity, the supplementary coverage devices and their corresponding coverage areas are generally referred to as "small cells," whereas the traditional base stations and their corresponding coverage areas are generally referred to as "macro cells."

As also mentioned above, to facilitate the paging of UEs operating in a RAN, sectors of the RAN may be grouped into tracking areas and assigned to one or more MMEs. In operation, an MME assigned to manage the paging for a tracking area may receive tracking area update messages from subscriber UEs that move into a coverage of the tracking area. And the MME may transmit to the base stations of a given tracking area page messages destined for UEs operating in that tracking area. In some RANs, an MME may be assigned to manage the paging for several tracking areas at the same time.

In accordance with one example zone-based paging configuration, just the macro cells of a RAN are grouped together into several tracking areas, whereas the small cells are not grouped together into tracking areas. Rather, each individual small cell may be considered to be its own tracking area. For example, in operation according to this type of paging configuration, when an MME (or other entity) has a page message to transmit to a UE that is located in a particular small cell, the MME (or other entity) may transmit the page message in just the particular small cell (i.e., not in any other nearby small cells or macro cells). By refraining to transmit the page message in other nearby small cells, this may reduce the potential paging load in those nearby small cells.

However, in this example zone-based paging configuration, because each small cell is considered its own tracking area, each time a UE enters into coverage of a new small cell, the UE may programmatically send a tracking area update message in the new small cell. This may lead certain small cells, especially those that are positioned near entrances and exits of residential neighborhoods, to receive an abundance of tracking area update messages from UEs that pass through the small cells, resulting ultimately in congestion at the small cells and a perhaps poor user experience.

To address this situation, and perhaps others, disclosed herein is a method that helps establish a zone-based paging configuration different from the one discussed above. In accordance with the method, a RAN entity may evaluate the level of traffic in each small cell located in a particular area. Based on this evaluation, the RAN entity may identify those small cells that have at least a threshold level of traffic and may responsively construct a new tracking area that includes the identified small cells. Constructing a new tracking area that includes several small cells may help reduce potential congestion in those small cells by reducing the number of tracking area update messages sent by UEs in those small cells. For instance, as UEs move through a group of small cells that are a part of the same tracking area, the UEs may refrain from sending tracking area update messages as they enter coverage of each new small cell (because each new small cell may be a part of the same tracking area). Other advantages of constructing new tracking areas exist as well.

The RAN entity may consider various measurements of traffic when evaluating the level of traffic in a particular small cell. For instance, in at least one embodiment of the method, the RAN entity may determine the number of times that UEs have handed over to the particular small cell. Accordingly, in this embodiment, the threshold level of traffic may be a threshold number of handovers in a given period of time (e.g., 100 handovers per hour).

Alternatively or additionally, in at least one embodiment of the method, the RAN entity may determine the aggregate amount of UE operating time in the particular sector over a given period of time. For instance, the RAN entity may determine the amount of time each individual UE operated in the particular sector on a given day. The RAN entity may then add up the individual UE operating times to result in an aggregate amount of UE operating time in the particular sector. The RAN entity may then compare the aggregate UE operating time to a threshold amount of time (e.g., 100 hours of UE operating time per day). However, a RAN entity may consider other measurements of traffic as well.

The RAN entity may include in the new tracking area any sectors (whether macro cells or small cells) that are within a threshold distance from the identified small cells. In one example, this threshold distance is 1000 feet; however, other threshold distances are possible as well. In embodiments in which the RAN entity includes a macro cell in the new tracking area, such as when the macro cell is within the threshold distance from one of the identified small cells, that macro cell may already be included in an existing tracking area. In this case, the macro cell would be included in two different tracking areas at the same time: the existing tracking area and the new tracking area. For conceptual purposes, the new tracking area may be thought of as a new tracking area layer that overlays the existing tracking areas of the RAN.

According to one embodiment of the method, the RAN entity may construct a new tracking area by instructing the base stations associated with sectors that are included in the new tracking area to broadcast on an overhead channel a new tracking area ID. In embodiments in which a particular sector of the new tracking area is already included in an existing tracking area (such as when a particular macro cell is within a threshold distance from one of the identified small cells), the RAN entity may instruct the base station associated with that particular sector to broadcast an additional tracking area ID. Other examples of constructing new tracking areas are possible as well.

Also disclosed herein is a second method that is designed to help UEs operate in a RAN environment in which there are two (or more) layers of tracking areas. In accordance with the second method, when a UE is currently registered in a current tracking area, the UE may move into coverage of a new sector (whether a macro cell or a small cell) and receive from a base station associated with the new sector two or more tracking area IDs. The UE may then determine whether one of those tracking area IDs matches that of the UE's current tracking area. If so, the UE may hand over to a base station of the new sector without registering in a new tracking area; if not, the UE may hand over to the base station of the new sector by registering in one of the tracking areas indicated by the tracking area IDs.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the claims.

BRIEF DESCRIPTION OF THE DRAWINGS

Various embodiments of the method are described herein with reference to the following drawings, wherein like numerals denote like entities.

DETAILED DESCRIPTION

1. Example Communication System Architecture

Figure 1:
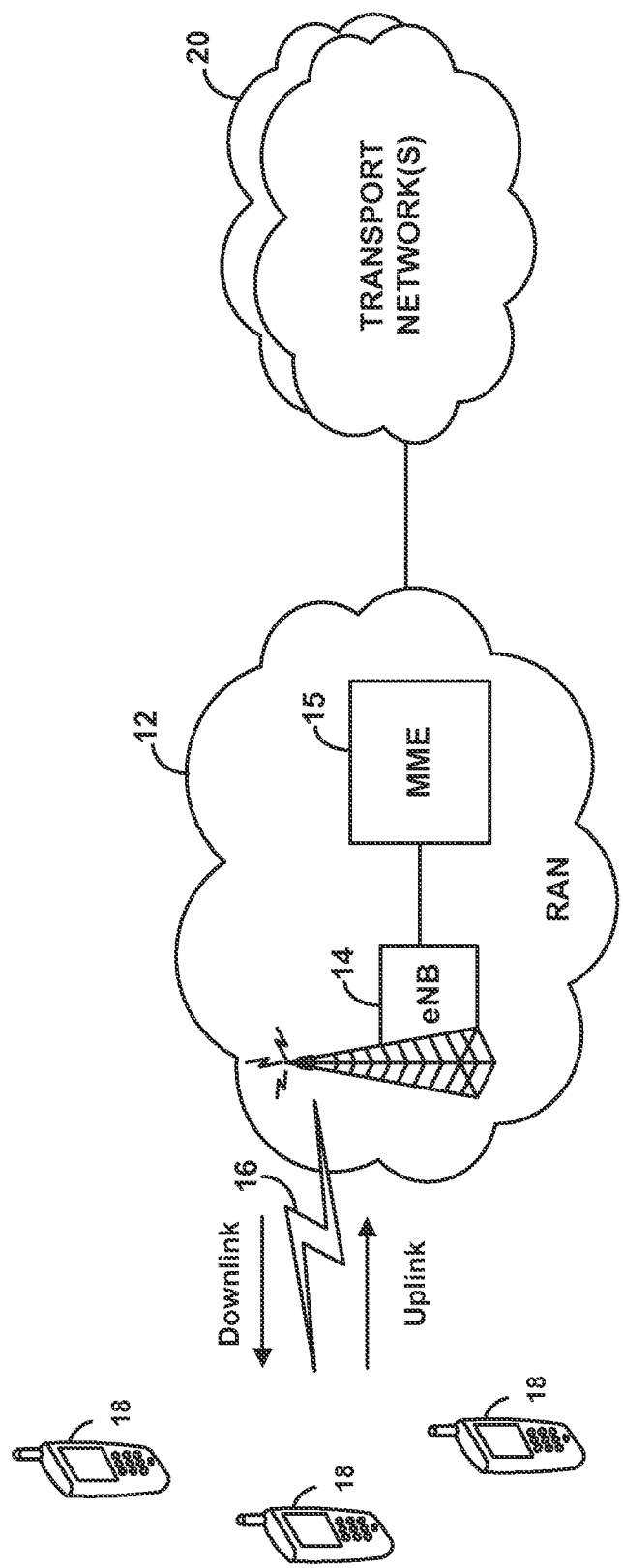
FIG. 1 depicts an example communication system, in which an example embodiment of the described arrangement can be implemented.

Referring to the drawings, as noted above, FIG. 1 is a simplified block diagram of an example wireless communication system in which at least one embodiment of the present method can be implemented. It should be understood that this and other arrangements described herein are set forth only as examples. As such, those skilled in the art will appreciate that other arrangements and elements (e.g., machines, interfaces, functions, orders, and groupings of functions, etc.) can be used instead, and that some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in data storage or another such non-transitory machine-readable medium.

At a general level, as shown in FIG. 1, the example wireless communications system includes at its core a RAN 12 having an eNodeB (eNB) 14, that radiates to define a wireless air interface 16 through which the eNB may communicate with at least one UE 18. The eNB 14 is in turn shown coupled to a Mobility Management Entity (MME) 16 that typically coordinates bearer setup and the tracking and paging of subscriber UEs operating in the RAN. RAN 12 then provides connectivity with one or more transport networks 20, such as the PSTN or the Internet for instance. With this arrangement, a UE 18 that is positioned within coverage of the base station and that is suitably equipped may engage in air interface communication with the base station and may thereby communicate with remote entities on the transport network(s) 20 and/or with other UEs served by the RAN.

At a more complex level, but still by way of example, the network architecture of RAN 12 may be configured to enable eNB 14 to communicate with UEs 18 over the air interface 16 according to one or more agreed air interface protocols, examples of which include Long Term Evolution (LTE) Code Division Multiple Access (CDMA), Universal Mobile Telecommunications System (UMTS), Wireless Interoperability for Microwave Access (WiMAX), IDEN, GSM, GPRS, EDGE, MMDS, WIFI, BLUETOOTH, and other protocols now known or later developed. For example, in a UMTS system configured to operate according to LTE standards, the base station is usually referred to as an eNodeB or an eNB. In a CDMA system configured to operate according to the IS-2000 standard (sometimes referred to as 1×RTT) or the IS-856 standard (sometimes referred to as 1×EV-DO), the base station is usually referred to as a Base Transceiver Station (BTS) and is usually under the control of a Base Station Controller (BSC). Other architectures and operational configurations of a RAN are possible as well.

As further shown in FIG. 1, the air interface 16 generally defines an uplink that carries wireless communications from the RAN 12 to the UEs 18 and a downlink that carries wireless communications from the UEs 18 to the RAN 12. Depending on the protocol, these links may be structured in various ways. At a high level, for instance, the eNB 14 may provide service on one or more frequency channels or bands, with downlink communications occupying one band and uplink communications occupying another band. Alternatively, downlink and uplink communications may be carried out on a common frequency band and may be differentiated through time division multiplexing and/or other techniques.

2. Example Network Device

Figure 2:
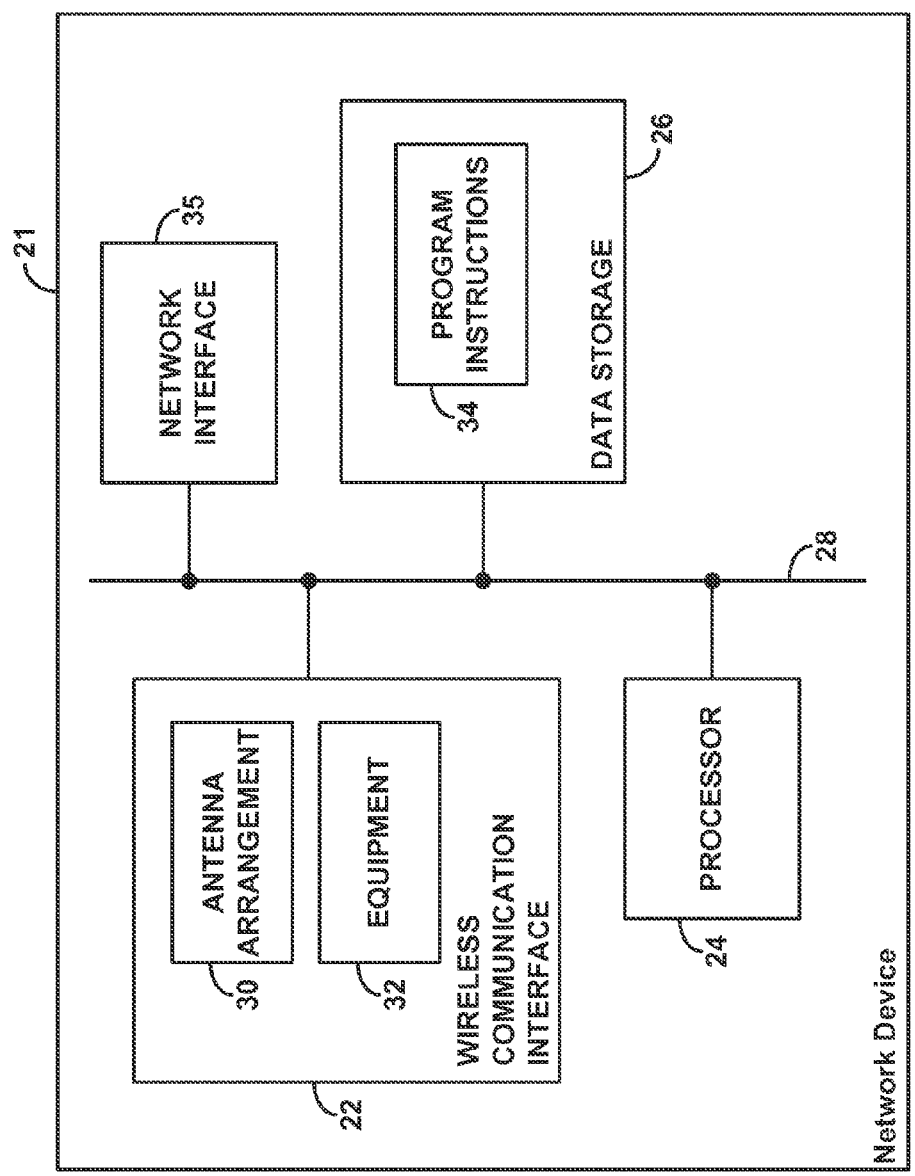
FIG. 2 depicts an example network device arranged to implement the present methods.

FIG. 2 is a simplified block diagram of an example network device 21 that may be configured to carry out network-side functions described herein. Network device 21 may be representative of an eNB (such as eNB 14), BTS, access node, access point, Node-B, femtocell, microcell, picocell, an MME (such as MME 15), or some other entity that may be associated with RAN 12. As shown in FIG. 2, the network device may include a wireless communication interface 22, a processor 24, and data storage 26, all of which may be coupled together by a system bus, network or other connection mechanism 28.

As further shown, wireless communication interface 22 may include an antenna arrangement 30 and associated equipment 32, the combination of which may enable network device 21 to communicate with UEs (or perhaps other network devices) on a network such as RAN 12. For example, wireless communication interface 22 may enable network device 21 to transmit downlink communications to UEs, and receive uplink communication from UEs. Accordingly, the antenna arrangement 30 may be tower mounted (when the network device 21 is a macro cell, such as an eNB or BTS) or enclosed within a housing of network device 21 (when the network device 21 is a small cell, such as a femtocell, picocell, or microcell) and configured to radiate to define one or more wireless coverage sectors in which UE 18 operates. The equipment 32 may include a trunk, optical link, or any Ethernet network interface card or other physical connection that can be coupled with any other entity on the RAN 12 or transport network(s) 20. By way of example, the equipment 32 may include a module, such as an CSM-series chipset made by Qualcomm Inc. of San Diego, Calif., and may support wireless packet-data communications according to a CDMA family of protocols. Other modules that support others communications protocols are possible as well.

Processor 24 may then comprise one or more general purpose processors (e.g., microprocessors) and/or special-purpose processors (e.g., digital signal processors and/or application specific integrated circuits) and may be integrated in whole or in part with the wireless communication interface. And data storage 26 may comprise one or more volatile and/or non-volatile storage components, such as a non-transitory computer-readable medium, and may be integrated in whole or in part with processor 24. Some examples of non-transitory computer-readable media include a hard disk drive, a Compact Disc (CD), a Digital Video Disk (DVD), a digital tape, flash memory, although others are possible.

As shown, network device 21 may also include a network interface 35. Network interface 35 may generally be any wired (e.g., Ethernet) or wireless (e.g., Wi Fi) interface over which the network device can transmit and receive data with another entity. In examples in which the network device 21 is a macro cell base station or an MME, the network interface 35 may be configured to communicate with other macro cell base stations, small cell base stations, other MMEs, and/or other network entities. In examples in which the network device 21 is a small cell base station, the network interface 35 may be configured to communicate with a home router, and thus to the Internet and/or one or more other packet-data networks. The small cell base station may establish via the network interface 35 a virtual-private-network (VPN) connection over the Internet with an entity (e.g., a VPN terminator) on the wireless service provider's core network. In this case, the small cell base station may then securely communicate with the VPN terminator and thereby communicate with other entities on the core network.

As further shown, data storage 26 may hold program instructions 34, which may be executable by processor 24 to carry out various base station or RAN 12 functions described herein. For instance, in accordance with the program instructions 34, the processor 24 may function to evaluate a level of traffic in each sector of a given area, based on the evaluation, identify sectors that have at least a threshold level of traffic, and in response to the identification, construct a new tracking area that includes the identified sectors.

As such, the processor 24 programmed with instructions 34 may define part or all of a controller for controlling operation of the network device 21. Alternatively or additionally, however, such control functionality could be provided external to the network device 21, such as within some other entity not shown but associated with RAN 12 or transport network(s) 20 in FIG. 1. Such an entity may be communicatively linked with the network device 21 and could serve to control aspects of the network device 21 and RAN operation generally.

By way of example, in embodiments in which network device 21 is a small cell (e.g., a femtotcell, picocell, microcell, or another type of device), the small cell may be approximately the size of a desktop phone or WiFi access point, although the small cell may take various forms. As such, the small cell may be a low-power, low-capacity version of a macro cell base station. Additionally, the small cell may use a general power outlet, perhaps with a transformer providing a DC power supply.

The small cell may also utilize the wireless communication interface 22 to wirelessly communicate with mobile devices according to wireless protocols such as CDMA, LTE, and the like. The small cell may thus act as a micro base station to provide local wireless coverage on the macro-network provider's network via the user's Internet connection. Further, the small cell may provide service on a single carrier frequency (or on a single carrier frequency per technology, where multiple technologies, such as CDMA and EV-DO, are supported). The small cell may also transmit a pilot beacon that includes administrative messages and parameters that UEs can use to connect with the small cell. The pilot beacon may include information to facilitate a handover of a UE from a macro cell to the small cell. To inform UEs of the small cell, the pilot beacon may be transmitted on one or more of the macro-network carrier frequencies on which the wireless service provider provides service in that area.

3. Example User Equipment

Figure 3:
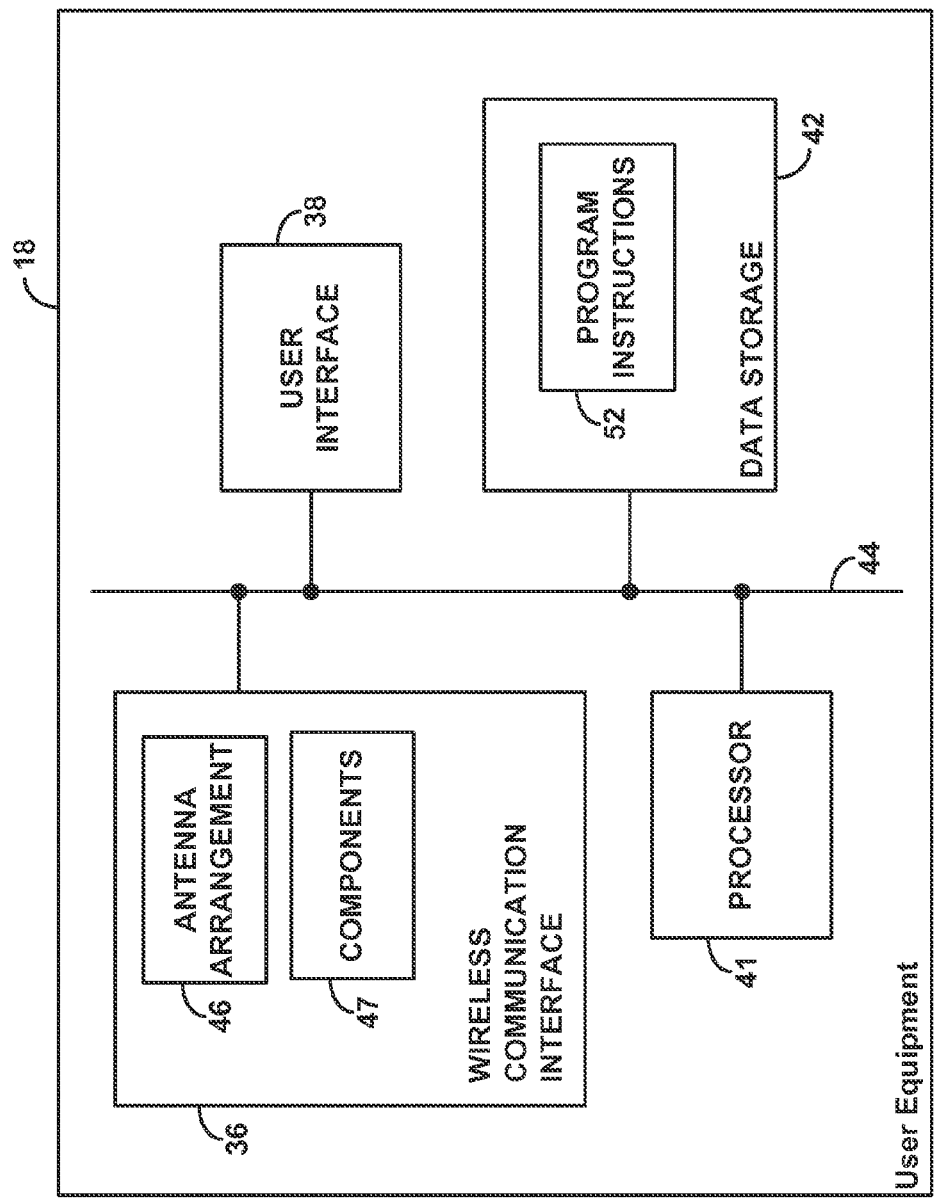
FIG. 3 depicts an example user equipment arranged to implement the present methods.

FIG. 3 is a simplified block diagram of a representative UE 18 (also possibly referred to as a mobile station, access terminal, a wireless communication device, or the like), such as a cellular telephone, wirelessly equipped tablet or personal computer, embedded wireless communication module, for instance. As shown, the representative UE may include a wireless communication interface 36, a user interface 38, a processor 41, and data storage 42, all of which may be coupled together by a system bus, network, or other connection mechanism 44.

Wireless communication interface 36 may comprise an antenna arrangement 46 and associated components 47, for engaging in communication with serving base stations, such as to transmit data and control information to the base stations and to receive data and control information from the base stations. For instance, the components 47 may include a mobile station modem, such as an MSM-series chipset made by Qualcomm Inc. However, other modules that support other protocols are possible as well.

User interface 38 may facilitate interaction with a user of the UE if applicable. As such, the user interface may include output components such as a display screen, loudspeaker, and headphone jack, and input components such as a keypad, a touch-sensitive screen, and a camera.

Processor 41 may comprise one or more general purpose processors and/or special-purpose processors and may be integrated in whole or in part with wireless communication interface 36. Data storage 42 may comprise one or more volatile and/or non-volatile storage components, such as a non-transitory computer-readable medium, and may be integrated in whole or in part with processor 41. Some examples of non-transitory computer-readable media include a hard disk drive, a Compact Disc (CD), a Digital Video Disk (DVD), a digital tape, flash memory, although others are possible. As shown, data storage 42 may hold program instructions 52, which may be executable by processor 41 to carry out various UE functions described herein.

For instance, in one embodiment of the present disclosure, the program instructions 52 may be executable by processor 41 to carry out functions including receiving from a new base station two tracking area IDs when a UE moves into coverage of the new base station, determining that at least one of the tracking area IDs is indicative of the tracking area in which the UE is currently registered, and responsively handing over to the new base station without transmitting a tracking area update message.

4. Example Configuration of Tracking Areas

Figure 4:
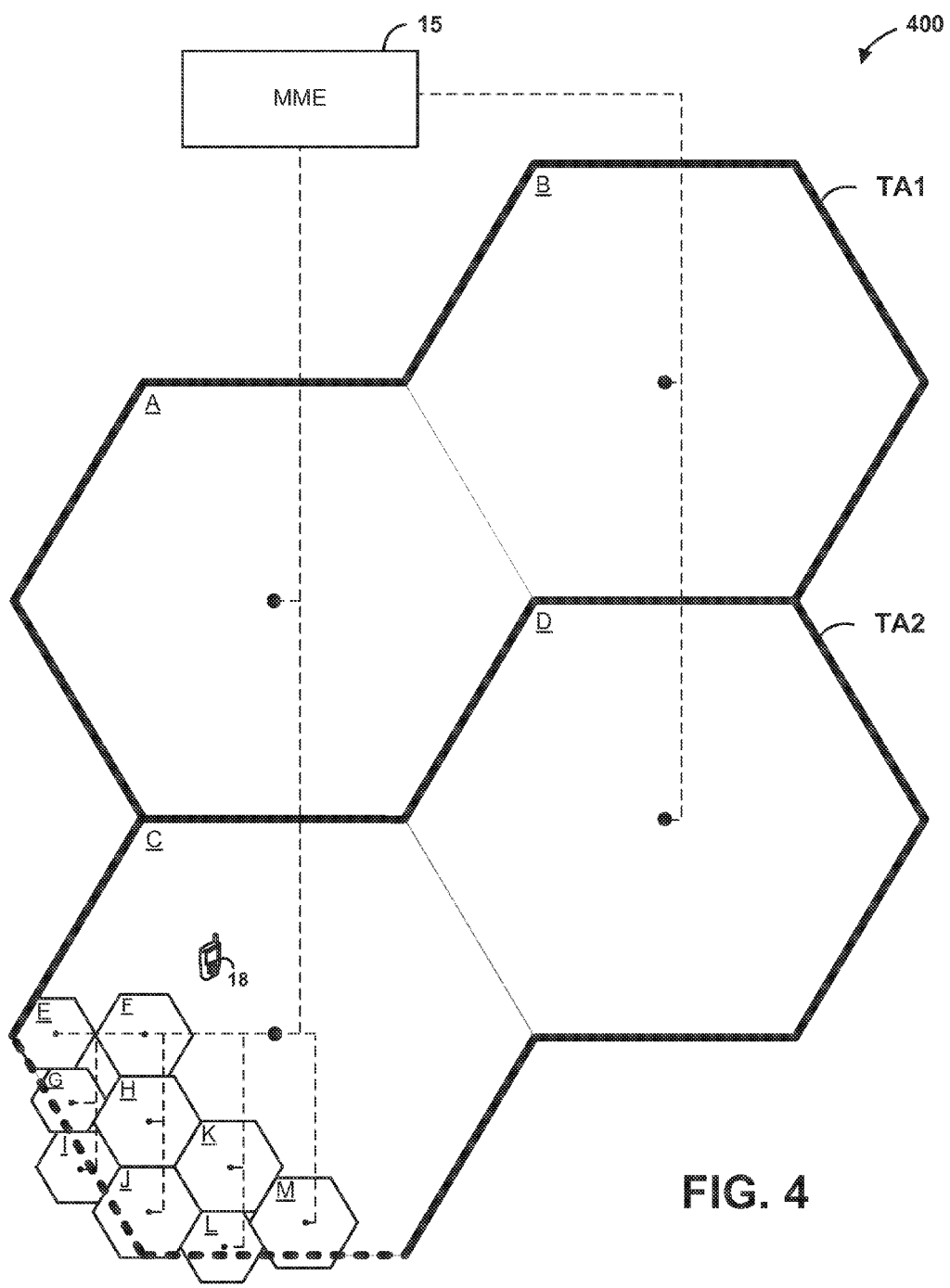
FIG. 4 depicts an example arrangement of tracking areas in which the present methods can be implemented.

FIG. 4 is a block diagram depicting a portion of an example wireless network 400. As shown in FIG. 4, network 400 includes thirteen wireless coverage sectors A-M, of which sectors A-D are macro cells and sectors E-M are small cells. As also depicted, the macro cells are grouped into tracking areas TA1 and TA2 to facilitate the paging of subscriber UEs operating in network 400, such as UE 18. In particular, tracking area TA1 includes sectors A and B, and tracking area TA2 includes sectors C and D. In addition to these sectors, network 400 may include additional sectors (not shown) that may or may not be grouped into additional tracking areas. Each sector in network 400 is generally defined by radiation of an antenna arrangement of a respective eNB or other device, such as a femtocell, microcell, or a picocell, all of which are hereafter referred to as "base station" for brevity. Additionally, each sector A-M is shown as being roughly hexagonal; however, in practice, wireless coverage sectors may be circular, oval, or any other shape.

As further shown, network 400 includes an MME 15 that generally manages the tracking and paging of UEs operating in network 400. To facilitate this, MME 15 may be communicatively coupled to each respective base station of the wireless coverage sectors A-M as well as perhaps to a UE registration database (not shown), which may store location information that indicates the most recent tracking area of UEs operating in network 400. A UE registration database may store other information as well, such as the location of various base stations.

To further facilitate the tracking and paging of subscriber UEs, in each sector a respective base station may broadcast over an air interface an identification of the tracking area in which the sector is included. In network 400, for example, base stations of sectors A and B may broadcast tracking area ID "TA1," and base stations of sectors C and D may broadcast tracking area ID "TA2." Accordingly, when, for example, UE 18 moves from a sector of tracking area TA1 into a sector of tracking area TA2, say sector C, UE 18 may detect the broadcast of tracking area ID "TA2" by a base station of sector C. Consequently, UE 18 may inform MME 15 that UE 18 is within coverage of tracking area TA2 so that MME 15 knows where to transmit a page message destined for UE 18. In particular, UE 18 may transmit a tracking area update message to a base station that radiates to define sector C, which in turn, may forward the tracking area update message to MME 15. In response, MME 15 may update a UE registration database with an indication that UE 18 is operating in tracking area TA2. Thus, in the event that MME 15 needs to page UE 18, MME 15 may refer to a UE registration database, determine that UE 18 is operating in tracking area TA2, and transmit the page message to the base stations that radiate to define the sectors of tracking area TA2. To keep MME 15 apprised of the UE's location, UE 18 may then transmit a new tracking area update message when it moves into coverage of a new tracking area, e.g., sector A of TA1.

In accordance with one paging scheme, small cells, such as sectors E-M, may not be grouped together into tracking areas. Rather, each small cell E-M may considered to be its own tracking area. Further, each base station associated with those small cells may broadcast a different tracking area ID (e.g., "M" for small cell M and "L" for small cell L). Accordingly, when, for example, UE 18 moves from a sector of tracking area TA1 into a small cell, say sector M, UE 18 may detect the broadcast of "M" by a base station of small cell M. Consequently, UE 18 may transmit a tracking area update message to the base station of small cell M, which in turn, may forward the tracking area update message to MME 15.

Moreover, in accordance with this paging scheme, should UE 18 move into coverage of a new small cell, say small cell L, UE 18 may detect the broadcast of "L" by a base station of small cell L. Consequently, UE 18 may transmit a tracking area update message to the base station of small cell L, which in turn, may forward the tracking area update message to MME 15. As a UE makes its way through a cluster of small cells, for instance, this pattern of repeatedly sending tracking area update messages as the UE enters each new small cell may lead to excessive signaling between the UE and the small cells and between the small cells and the MME. This excessive signaling may result in congestion at the small cells and/or at the MME.

In accordance with one method designed to help mitigate this potential congestion, a RAN entity, such as an MME, may evaluate the level of traffic in each small cell that is located in a particular area, identify those small cells that have at least a threshold level of traffic and responsively construct a new tracking area that includes at least those identified small cells. As mentioned briefly above, as a general matter, it may be advantageous to some arrange small cells into tracking areas as doing so may reduce the processing load and uplink congestion in those small cells, as well as perhaps have other advantages for the network. For instance, as a UE moves through a cluster of small cells that are all part of the same tracking area, the UE may refrain from sending tracking area update messages as it enters each new small cell, which may result in less congestion at the small cells and a lighter processing load at the MME.

Referring back to FIG. 4, in accordance with the method described above, MME 15 may evaluate the level of traffic in each small cell that is located in or around the lower left-hand corner of macro cell C (i.e., small cells E-M). As described briefly above, the MME 15 may evaluate various kinds of measurements when evaluating the level of traffic among small cells. For instance, in one embodiment of the method, MME 15 may evaluate the number of times that UEs have handed over to each small cell E-M in a given period of time (e.g., a day). To do this, the MME 15 may refer to the UE registration database (not shown) and determine the number of tracking area update messages received in that small cell on a particular day. Alternatively, MME 15 may refer to a database that keeps handover records and determine the number of handovers made to that small cell on a particular day. Still alternatively, the small cells may keep their own handover records, and MME 15 may poll the individual small cells to determine the number of handovers made to each individual small cell. Other ways of evaluating the number of times a UE handed over to a particular small cell are possible as well.

Additionally or alternatively, in one embodiment of the method, MME 15 may evaluate the aggregate amount of UE operating time in each small cell E-M over a given period of time (e.g., a day). For instance, the MME may determine the amount of time that each individual UE operated in the particular sector on a particular day. To do this, MME 15 may again refer to a UE registration database (not shown) and, for each UE that entered the particular small cell on the particular day, the MME may measure the time between when a UE entered the particular small cell and when the UE entered a new small cell. The MME may then add up these individual UE operating times to result in an aggregate amount of UE operating time in the particular sector. The RAN entity may then compare this aggregate UE operating time to a threshold amount of time (e.g., 100 hours of UE operating time per day). However, other ways of evaluating the aggregate amount of UE operating time in each small are possible as well.

Based on evaluation of the level of traffic in small cells E-M, MME 15 may identify which of those small cells have at least a threshold level of traffic. For example, in embodiments in which MME 15 considers the number of times UEs have handed over to the small cells, MME 15 may identify small cells that have experienced a threshold number of handovers over a particular period of time (e.g., 1000 handovers per day). Additionally or alternatively, in embodiments in which MME 15 considers the aggregate time spent by UEs in the small cells, MME 15 may identify small cells that have experienced a threshold amount of UE operating time over a particular time period (e.g., 1000 hours of total UE operating time per day). In some embodiments of the method, MME 15 selects a particular threshold level of traffic so that a desired number of small cells are identified. For instance, say MME 15 evaluates the number of UE handovers per day in an example set of small cells N, O, P, Q, and R and determines that the number of UE handovers in small cell N is 1000; O, 750; P, 700; Q, 500; and R, 250. If it were desired that MME 15 identify just three small cells from which to construct a new tracking area, the MME may select the threshold level of traffic to be 700 UE handovers per day. Thus, the MME 15 would identify small cells N, O, and P as having at least a threshold level of traffic. MME 15 may select threshold levels of traffic in other ways and for other reasons as well.

Referring back to FIG. 4, as a result of evaluating the level of traffic among small cells E-M, MME 15 may identify each of small cells K-M as having at least a threshold level of traffic (whether by number of handovers, aggregate amount of time spent by UEs in the small cell, or some other metric(s)). For instance, MME 15 may identify small cells K and M as having at least a threshold level of traffic because MME 15 may have determined that small cells K and M experienced at least 100 UE handovers per day. And MME 15 may identify small cell L as having at least a threshold level of traffic because MME 15 may have determined that small cell L experienced at least 100 hours of UE operating time per day. MME 15 may identify small cells as having at least a threshold level of traffic in other ways as well.

Finally, in response to identifying the small cells that have at least a threshold level of traffic, the MME may construct a new tracking area that includes the identified small cells. As indicated briefly above, one way to construct a new tracking area is to for MME 15 to instruct the base stations associated with the sectors of the new tracking area to broadcast a new tracking area ID (e.g., "TA2$_1$"). Such an instruction may come in the form of a message transmitted by the MME 15 to an individual base station. In addition to instructing a base station to broadcast a new tracking area ID, MME 15 may update one or more registration databases (not shown) to indicate which sectors are a part of which tracking areas. Other ways of changing a sector's tracking area are possible as well.

In some embodiments of the method, the MME may construct a new tracking area that includes the identified small cells as well as any other sectors (whether small cells or macro cells) that are within a threshold distance (e.g., 1000 feet) from an identified small cell. MME 15 may do this, for example, by referring to base station coordinates in a registration database (or at some other entity) and determining which base stations are located within the threshold distance from any of the identified small cells. As indicated above, in the example depicted in FIG. 4, MME 15 may have identified small cells K, L, and M as having at least a threshold level of traffic. Responsively, MME 15 may construct a new tracking area that includes small cells K, L, and M, as well as sectors that are within a threshold distance (e.g., 1000 feet) from any of small cells K, L, M, which in this example may happen to be small cells H and J and macro cell C.

Figure 5:
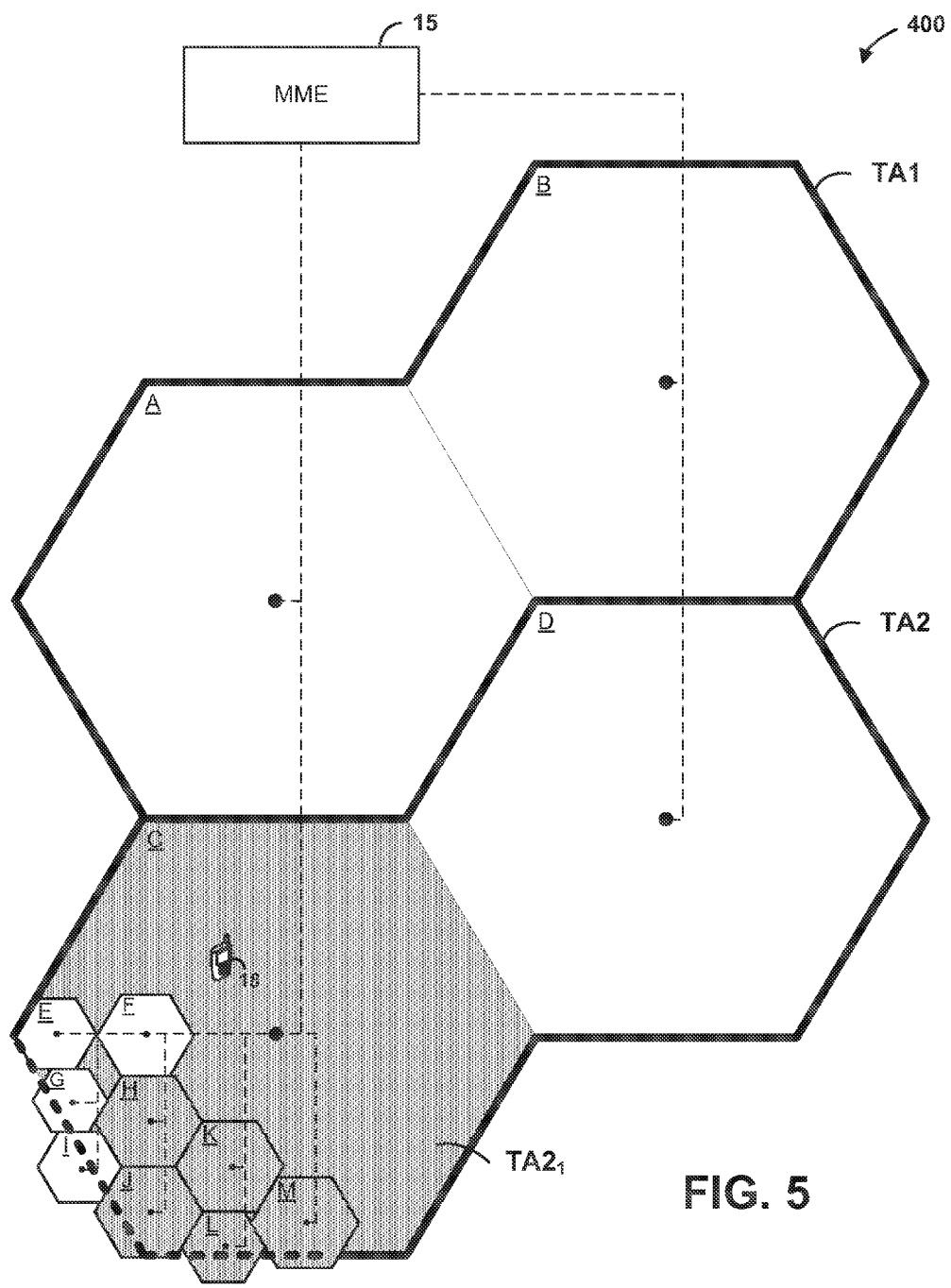
FIG. 5 depicts an example arrangement of tracking areas in which the present methods can be implemented.

FIG. 5 depicts a portion of network 400 after MME 15 constructed a new tracking area, TA2$_1$ that includes small cells H, J, K, L, and M and macro cell C, as depicted by the shaded sectors. As indicated, the MME may construct a new tracking area that includes a macro cell that is already included in an existing tracking area. In the example depicted in FIG. 5, macro cell C was already included in tracking area TA2. And as a result of the above-described process, macro cell C is also included in new tracking area TA2$_1$. In this case, MME 15 may have instructed the base station associated with macro cell C to broadcast an additional tracking area ID (e.g., "TA2$_1$"). Consequently, in the example depicted in FIG. 5, base stations of small cells H, J, K, L, and M may broadcast over an air interface the tracking area ID "TA2$_1$," whereas a base station of macro cell C may broadcast over an air interface two tracking area IDs: "TA2$_1$" and "TA2." Conceptually, tracking area TA2$_1$ may be thought of as a new tracking area layer that overlays the existing tracking areas TA1 and TA2, as well as perhaps other tracking areas not shown in FIG. 5. Other ways of constructing new tracking areas that include sectors that are already included in existing tracking areas are possible as well.

When a UE is registered in a current tracking area and moves into coverage of a new sector (whether that sector is a macro cell or a small cell) the UE may receive from a base station associated with the new sector two or more tracking area IDs. The UE may then determine whether at least one of those tracking area IDs is indicative of the tracking area in which the UE is currently registered. To do this, the UE may refer to its memory storage to retrieve an indication of which tracking area the UE is currently registered in and compare that indication to the two tracking area IDs received from macro cell C. Although the UE may carry out this determination in other ways as well. If at least one of those tracking area IDs is indicative of the tracking area in which the UE is currently registered, then the UE will hand over to the new sector without transmitting a tracking area update message. If at least one of those tracking area IDs is not indicative of the tracking area in which the UE is currently registered, then the UE will hand over to the new sector and transmit a tracking area update message.

For example, in FIG. 5, UE 18 may be currently registered in tracking area TA2$_1$, and may move from coverage of small cell K to coverage of macro cell C. Under coverage of macro cell C, UE 18 may receive from a base station associated with macro cell C a broadcast of both tracking area ID TA2$_1$ and tracking area ID TA2. UE 18 may determine that at least one of those broadcast tracking area IDs is indicative of the tracking area in which the UE currently registered (i.e., tracking area TA2$_1$). In response to determining that at least one of the broadcast tracking area IDs is indicative of the tracking area in which the UE is currently registered, UE 18 may hand over to macro cell C without transmitting a tracking area update message.

In another example, UE 18 may be registered in tracking area TA2$_1$, and may move from coverage of macro cell C to coverage of macro cell D. Under coverage of macro cell D, UE 18 may receive from a base station associated with macro cell D a broadcast of just one tracking area ID, TA2. In accordance with the second method, UE 18 may determine that the broadcast tracking area ID is not indicative of a tracking area in which UE 18 is currently registered (i.e., tracking area TA2$_1$). Responsively, UE 18 may hand over to macro cell D and transmit a tracking area update message to the base station of sector D.

Figures 6, 7:
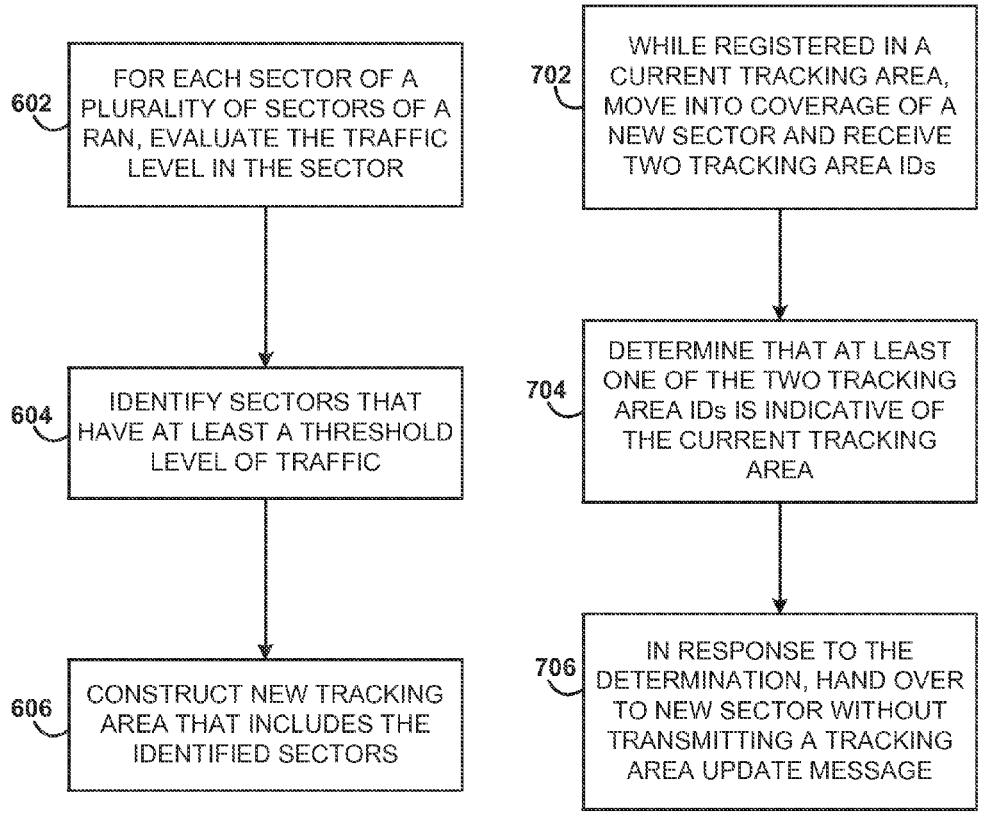
FIG. 6 is a flowchart depicting functions that can be carried out in accordance with the present methods.
FIG. 7 is a flowchart depicting functions that can be carried out in accordance with the present methods.

FIG. 6 is a flowchart depicting functions that can be carried out by a RAN entity (such as an MME), in accordance with at least one embodiment of the present method. This process begins at block 602 where the RAN entity evaluates the traffic level for each sector of a plurality of sectors of the RAN. For example, as described above, the RAN entity may carry this out by evaluating the number of handovers to each sector in a given time period, evaluating the aggregate amount of time spent by UEs in each sector, or by evaluating some other measurement of traffic.

The process continues at block 604, where the RAN entity identifies sectors that have at least a threshold level of traffic. For example, as described above, the RAN entity may identify sectors that experience at least 100 UE handovers per hour. Alternatively or additionally, the RAN entity may identify sectors that have an aggregate amount of UE operating time of 100 hours per day. Other thresholds are possible.

The process continues at block 606 where the RAN entity constructs a new tracking area that includes the identified sectors. For example, as described above, the RAN entity may carry this out by instructing base stations associated with the identified sectors to broadcast a tracking area ID indicative of the new tracking area. In embodiments, in which the new tracking area includes a sector that is already included in an existing tracking area, the RAN entity may instruct the base station associated with that sector to broadcast an additional tracking area ID. In addition, the RAN entity may update one or more databases to indicate which base stations are a part of which tracking areas. Other ways of constructing a new tracking area are possible as well.

FIG. 7 is a flowchart that depicts functions that can be carried out by a UE, in accordance with at least one embodiment of the description set forth above. This process begins at block 702 where a UE, while registered in a current tracking area, moves into coverage of a new sector and receives two tracking area IDs broadcast by a base station associated with that new sector.

Continuing at block 704, the UE determines that at least one of the two tracking area IDs is indicative of the tracking area in which the UE is currently registered. For example, as indicated above, the UE may refer to memory storage to retrieve an indication of which tracking area the UE is currently registered. Other ways of making this determination are possible as well. Finally, at block 706, in response to the determination of block 704, the UE hands over to the new sector without transmitting a tracking area update message.

5. Conclusion

Various embodiments have been described above. Those skilled in the art will understand, however, that changes and modifications may be made to these embodiments without departing from the scope of the claims.

We claim:

1. In a radio access network (RAN) that provides wireless service to user equipment devices (UEs) that are located in sectors of the RAN, the sectors including a plurality of macro cells and a plurality of small cells, wherein the plurality of macro cells are arranged into a plurality of tracking areas, a method comprising:
   for each given sector of a plurality of sectors, a RAN entity evaluating a level of traffic in the given sector;
   based on the evaluating, the RAN entity identifying sectors that have at least a threshold level of traffic; and
   in response to the identifying, the RAN entity constructing a new tracking area that includes the identified sectors, wherein the identified sectors are thereby arranged into two distinct tracking areas, the two distinct tracking areas including an existing tracking area and the new tracking area, wherein the identified sectors are associated with respective base stations, and wherein constructing the new tracking area that includes the identified sectors comprises instructing the respective base stations associated with the identified sectors to broadcast a tracking area ID that is indicative of the new tracking area.

2. The method of claim 1, wherein the RAN entity evaluating the level of traffic in the given sector comprises the RAN entity determining a number of UE handovers to the given sector in a given period of time, and wherein the threshold level of traffic comprises a threshold number of UE handovers.

3. The method of claim 1, wherein the RAN entity evaluating the level of traffic in the given sector comprises the RAN entity determining an aggregation of time spent by UEs in the given sector in a given period of time, and wherein identifying the sectors that have at least the threshold level of traffic comprises identifying sectors that have at least a threshold amount of the aggregated time spent by one or more of the UEs in the sectors.

4. The method of claim 1, wherein the new tracking area includes a macro cell that is already part of an existing tracking area.

5. The method of claim 4, wherein the macro cell is associated with a base station that broadcasts over an air interface a tracking area ID that is indicative of the existing tracking area in which the macro cell is already included, and wherein constructing the new tracking area that includes the macro cell comprises instructing the base station associated with the macro cell to broadcast an additional tracking area ID.

6. The method of claim 1, wherein at least one of the identified sectors is a small cell.

7. The method of claim 1, further comprising constructing the new tracking area to also include one or more sectors that are within a threshold distance from the identified sectors.

8. In a radio access network (RAN) that includes sectors organized into tracking areas, wherein each given sector of the RAN is associated with a respective base station that broadcasts over an air interface a tracking area ID that is indicative of a tracking area in which the given sector is included, and wherein a user equipment device (UE) is located in a current sector of the RAN and is registered in a current tracking area in which the current sector is included, a method comprising:
   the UE moving into coverage of a second sector and receiving from a second base station in the second sector two tracking area IDs;
   the UE determining that at least one of the two tracking area IDs is indicative of the current tracking area in which the UE is registered;
   in response to the determining, the UE handing over to the second base station without transmitting a tracking area update message;
   the UE moving into coverage of a third sector and receiving from a third base station in the third sector a new tracking area ID, wherein the new tracking area ID is identical to one of the two tracking area IDs received at the UE from the second base station;
   the UE determining that the new tracking area ID is indicative of a tracking area in which the UE is not currently registered; and
   in response to the UE determining that the new tracking area ID is indicative of the tracking area in which the UE is not currently registered, the UE handing over to the third base station and transmitting the tracking area update message.

9. The method of claim 8, wherein each of the two tracking area IDs is indicative of a respective tracking area in which the second sector is included.

10. The method of claim 8, wherein the second sector is a small cell.

11. A radio access network (RAN) entity arranged to operate in a RAN that provides wireless service to user equipment device (UEs) that are located in sectors of the RAN, the sectors including a plurality of macro cells and a plurality of small cells, wherein the plurality of macro cells are arranged into a plurality of tracking areas, the RAN entity comprising:
   a non-transitory computer readable medium (CRM);
   at least one processor; and
   instructions stored on the CRM and executable by the at least one processor for carrying out functions including:
      for each given sector of a plurality of sectors of the RAN, evaluating a level of traffic in the given sector;
      based on the evaluating, identifying sectors that have at least a threshold level of traffic; and
      in response to the identifying, constructing a new tracking area that includes the identified sectors, wherein the identified sectors are thereby arranged into two distinct tracking areas, the two distinct tracking areas including an existing tracking area and the new tracking area, wherein the identified sectors are associated with respective base stations, and wherein constructing the new tracking area that includes the identified sectors comprises instructing the respective base stations associated with the identified sectors to broadcast a tracking area ID that is indicative of the new tracking area.

12. The RAN entity of claim 11, wherein the RAN entity evaluating the level of traffic in the given sector comprises the RAN entity determining a number of UE handovers to the given sector in a given period of time, and wherein the threshold level of traffic comprises a threshold number of UE handovers.

13. The RAN entity of claim 11, wherein the RAN entity evaluating the level of traffic in the given sector comprises the RAN entity determining an aggregation of time spent by one or more of the UEs in the given sector in a given period of time, and wherein the threshold level of traffic comprises a threshold amount of time.

14. The RAN entity of claim 11, wherein the new tracking area includes a macro cell that is already part of an existing tracking area.

15. The RAN entity of claim 14, wherein the macro cell is associated with a base station that broadcasts over an air interface the tracking area ID that is indicative of the existing tracking area in which the macro cell is already includes, and wherein constructing the new tracking area that includes the macro cell comprises instructing the base station associated with the macro cell to broadcast an additional tracking area ID.

16. The RAN entity of claim 11, wherein at least one of the identified sectors is a small cell.

17. The RAN entity of claim 11, wherein the functions further comprise constructing the new tracking area to include sectors that are within a threshold distance from the identified sectors.

* * * * *